United States Patent [19]
Ballard et al.

[11] 3,914,170
[45] Oct. 21, 1975

[54] EROSION PREVENTION AND FAULT DETECTION FOR ELECTROCHEMICAL MACHINING APPARATUS

[75] Inventors: Norman D. Ballard, Hartford; John Zubeckis, Cromwell, both of Conn.

[73] Assignee: United Aircraft Corporation, East Hartford, Conn.

[22] Filed: Mar. 19, 1973

[21] Appl. No.: 342,924

[52] U.S. Cl....... 204/224 M; 204/228; 204/DIG. 12
[51] Int. Cl.².......................................... C25D 17/00
[58] Field of Search......... 204/224 M, DIG. 12, 228

[56] References Cited
UNITED STATES PATENTS

| | | | |
|---|---|---|---|
| 2,508,523 | 5/1950 | Krebs | 204/219 |
| 2,834,728 | 5/1958 | Gallone | 204/228 |
| 3,594,299 | 7/1971 | Inoue | 204/DIG. 12 |
| 3,761,380 | 9/1973 | Ballard | 204/228 |

Primary Examiner—Oscar R. Vertiz
Assistant Examiner—Wayne A. Langel
Attorney, Agent, or Firm—Donald F. Bradley

[57] ABSTRACT

Destructive erosion of the tips of cathodes used in electrochemical machining operations, which is due to reverse current flow through the workpiece and cathode during nonmachining operations, is prevented by continuously passing a small DC current through the workpiece and cathode in the same direction as the normal current flow during machining operations. The voltage drop produced by the current flow may also be used to indicate the occurrence of a fault such as a lower than normal gap resistance between the cathode and workpiece during non-machining operations and thereby prevent actuation of the main power supply until the fault is corrected.

4 Claims, 3 Drawing Figures

EROSION PREVENTION AND FAULT DETECTION FOR ELECTROCHEMICAL MACHINING APPARATUS

BACKGROUND OF THE INVENTION

1. Field of the Invention

This invention relates to electrochemical machining (ECM) apparatus, and more particularly to an electronic circuit for preventing destructive erosion of cathode tips due to reverse current flow during nonmachining operations. The circuit may also be adapted to sense the occurrence of a lower than normal gap resistance such as is caused by mechanical contact between the cathode and the workpiece and prevent actuation of the main power supply.

2. Description of the Prior Art

In the operation of electrochemical machining apparatus, the machining process is basically one of electrolysis wherein a DC voltage is applied between one or more electrodes and a workpiece, the workpiece being connected to the positive terminal of a DC voltage source and the electrodes being connected to the negative terminal. A conductive solution or electrolyte, which often comprises an aqueous solution of a soluble metallic salt, is introduced between the electrodes and the workpiece usually by pumping it through holes in the electrodes. The electrolyte acts to carry the current from the workpiece to the electrode so that when electrical current flows, a chemical reaction takes place dissolving the workpiece metal. During the electrolysis, the material on the workpiece opposite each electrode goes into the solution and is flushed away. As this electrochemical erosion takes place, the position of the electrode or the workpiece is adjusted so that the gap between the electrodes and the workpiece remains constant. During normal operations, and in the absence of a spark, substantially all of the DC voltage is across the gap.

A problem which has arisen in connection with the operation of small hole ECM cathodes is that of destructive erosion of the cathode tip. After a short period of use, the outside edges of the cathode tips have been found to be severly eroded. Investigation showed that the erosion was the result of reverse current flow during nonmachining periods with the cathode tip becoming anodic.

The present invention describes a simple electronic circuit which may be incorporated in the ECM apparatus and which completely eliminates the problem of destructive cathode erosion.

Another problem in the operation of typical ECM apparatus is damage caused to the cathode and/or the workpiece as a result of a lower than normal gap resistance between the cathode and the workpiece before the main ECM power supply is turned on. Because there is no current flow and no voltage drop in the workpiece-cathode circuit when the main power supply is turned off, prior art techniques for determining the occurrence of a short circuit or a spark during normal operation are not applicable.

By the addition of a simple voltage comparator to the cathode erosion prevention circuit, actuation of the main power supply is prevented when electrical contact between the cathode and the workpiece occurs, thereby also preventing damage to the apparatus.

SUMMARY OF THE INVENTION

It is therefore an object of this invention to prevent destructive erosion of the cathode tip in an ECM apparatus.

In accordance with a preferred embodiment of this invention, a small DC voltage is supplied between the workpiece and the cathode to cause a current flow therethrough in the same direction as that which occurs during normal machining operations. The current flow prevents stored voltages produced on the surface of fixtures by stray leakage currents and composed of oxide barrier layers from producing cathode eroding reverse currents during non-machining operations.

Another object of the present invention is the prevention of damage caused by a lower than normal gap resistance between the cathode and workpiece when the main power supply is turned on.

In accordance with another embodiment of the invention, the voltage drop across the workpiece and cathode produced by the current flow of the cathode erosion prevention circuit is measured and fed to a voltage comparator where it is compared with a fixed reference voltage dependent upon the resistance of an individual cathode. If electrical contact has occurred, the voltage drop will be below the reference voltage, and actuation of the main power supply is prevented.

DESCRIPTION OF THE PREFERRED EMBODIMENT

Figure 1:
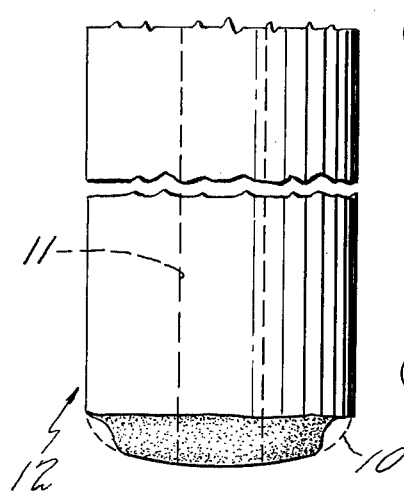
FIG. 1 is an enlarged view of a cathode showing the destructive erosion which occurs at the tip thereof.

In FIG. 1, which is a front elevation of the lower portion of a typical ECM cathode, there is shown the destructive erosion which often occurs to a cathode 12 after a short period of use. The dotted line 10 shows the normal shape of the cathode. The tip of the cathode in a typical case is approximately 0.035 inch in diameter. Cathode material is typically full hard beryllium-copper alloy No. 25 for use with saline electrolytes. The tip area is machined to the contour shown by dotted line 10 in FIG. 1 and constitutes the working portion of the tool as it is fed downward relative to the workpiece being electrochemically machined. The upper portion of the cathode is coated with a thin layer of suitable material to provide electrical insulation.

Shown by dotted lines 11 in FIG. 1 is a centrally located duct through which the saline electrolyte is continuously fed during normal machining operations.

Investigation of the cause of the tip erosion of cathode 12 showed that it was the result of reverse current flow during nonmachining periods, that is, during periods when the main power supply was turned off. During these time periods, the cathode 12, which is normally at a negative potential with respect to the workpiece, became anodic.

Figure 2:
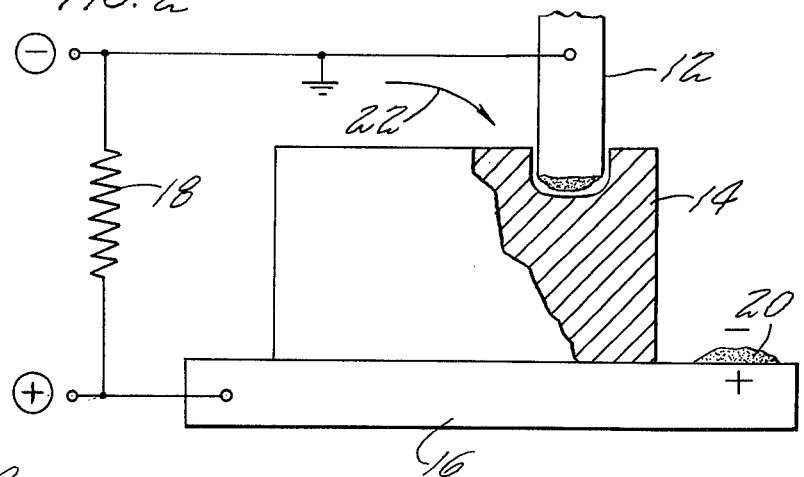
FIG. 2 is a schematic showing a typical ECM cathode and workpiece.

Referring to FIG. 2, there is shown the cathode 12 and a typical metallic workpiece 14. The workpiece 14 is normally carried by a workpiece fixture 16. During machining operations, a negative potential is applied to the cathode 12, and a positive potential to the workpiece through fixture 16. A load resistor 18 is typically connected across the main power supply. The cathode 12 is typically grounded relative to the workpiece 16 and fixture 14.

During normal operation of the ECM apparatus, current flow occurs from the positive workpiece 14 to the negative cathode 12 through the electrolyte solution. It has been discovered that when the cathode 12 is electrically energized and fed into the workpiece 14, stray leakage currents pass from the cathode 12 to the area 20 on the fixture 16 by means of a pathway which includes the uninsulated portions of the cathode 12 and the electrolyte stream. This stray current flow remains on the surface of the fixture so that it resembles an electrolytic cell. This cell or cells 20 on the surface of the workpiece fixture 16 is composed of oxide barrier layers with a negative top surface polarity and a positive bottom surface polarity in contact with the fixture 16 as shown in FIG. 2.

It is considered that the destructive cathode erosion is caused by the presence of the electrolytic cell 20 in conjunction with the presence of a previously unsuspected electrical circuit operating within the closed loop comprising the cathode 12, the load resistor 18 and the workpiece fixture 16. It is theorized that the electrolytic cell 20 retains its charge and during periods of nonmachining constitutes a current source for the closed loop comprising the workpiece fixture 16, the load resistor 18, the cathode 12 and through residual leakage pathways on various surfaces wet with electrolyte back to the electrolytic cell 20 with the direction of current flow shown by arrow 22. The load resistor and the cathode resistance are relatively low in value and have negligible differential potentials across them. The interface between the cathode 12 and the wet leakage path offers a higher resistance to the current flow. From the direction of current flow and the relatively high resistance of the interface between the cathode surface 12 and the leakage paths, it may be seen that the tip of cathode 12 becomes anodic with respect to its immediate surroundings, resulting in the destructive electrochemical erosion shown in FIG. 1. Voltages measured across the load resistor 18 and during nonmachining periods range up to a maximum of approximately 1.0 volts.

Figure 3:
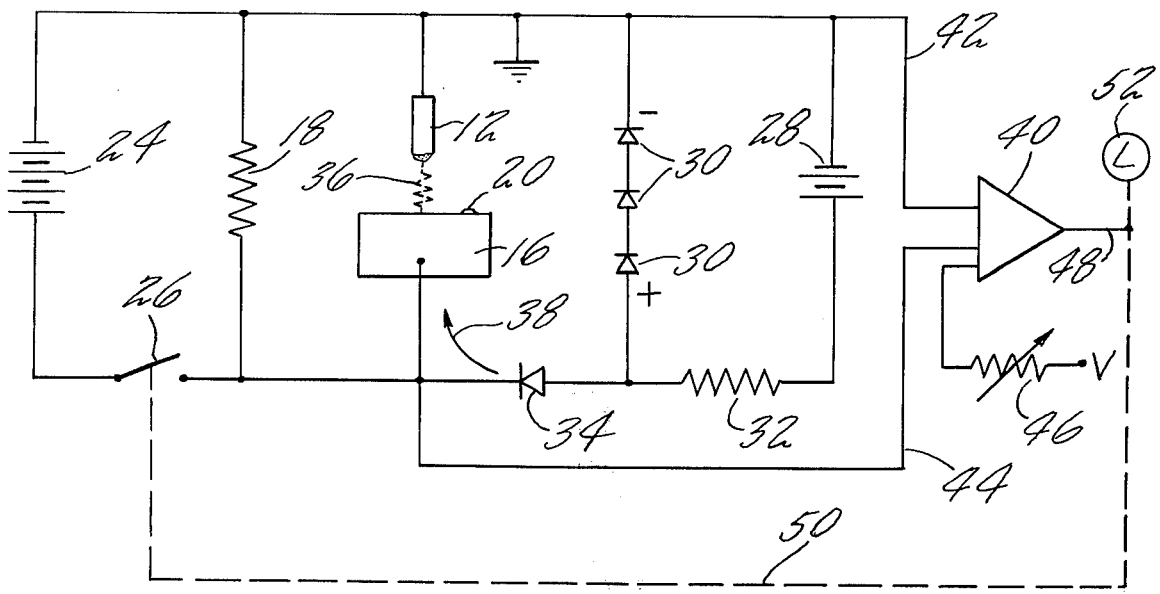
FIG. 3 is an electronic schematic of the circuit construction which will prevent destructive cathode erosion and prevent turn-on of the main power supply if electrical contact is made between the cathode and a workpiece.

FIG. 3 shows an electrical schematic form a circuit for preventing the destructive erosion of the cathode tips which would otherwise result from the use of the type of tooling shown in FIG. 2 which continually passes current through the cathode 12 in the reverse direction. The desired result cannot be accomplished by simply short circuiting the cathode 12 to the fixture 16 during periods of nonmachining since this would only serve to increase the erosion current by reducing several of the path resistances to zero. Likewise, the desired result cannot be accomplished by opening the load resistor 18 since there are other residual leakage pathways on wet surfaces between the cathode 12 and the fixture 16 which would serve to complete the loop. In neither case would the nonmachining current flow be eliminated or reversed.

Referring to FIG. 3, there is shown the cathode 12 and workpiece fixture 16 connected to the main ECM power supply 24 across which is connected a load resistor 18. A switch 26 energizes the ECM apparatus when closed.

Connected across the cathode 12 and fixture 16 circuit is a DC power supply 28 of approximately 15 volts, the power supply being suitably current limited by a resistor 32 of approximately 500 ohms. A small current of approximately 30 milliamps is continuously passed through a string of 3 diodes 30 maintaining a voltage drop across these diodes of approximately 1.5 volts with the polarities as shown. During nonmachining periods, power supply 28 also maintains a current flow through diode 34 of approximately 0.5 volts thereby maintaining approximately 1.0 volts between the workpiece fixture 16 and the cathode 12, the cathode at this time being negative with respect to the workpiece fixture 16. A resistor 36 is shown in phantom connected between the fixture 16 and the cathode 12 to represent the leakage paths and interfaces through which the current flow occurs.

The voltage of approximately 1.0 across the fixture-cathode circuit has been chosen to be equal to or slightly greater than the maximum voltage measured across the electrolytic cell 20. The diode 34 serves to prevent the higher ECM voltages, typically 5–15 volts, produced by power supply 24 from entering the antierosion circuit and damaging the diode string 30 during machining periods.

The resulting current flow from power supply 28 flows in a direction shown by arrow 38 which is opposite to the direction of the current flow caused by the electrolytic cell 20. The maintenance of the current flow in the opposite direction insures that under no conditions can anodic currents flow which cause the destructive erosion shown in FIG. 1. The small cathodic currents resulting from the circuit of FIG. 3 cause no erosion of the cathode tips, but do produce a small rate of erosion over the comparatively large wetted areas of the fixture 16 which is of no practical significance.

By means of a simple modification to the circuit of FIG. 3, it is possible to avoid the electrical burn damage that may occur if ECM power is applied when the cathode 12 is unintentionally in mechanical contact with or close to the workpiece 16 so that the gap resistance is lower than normal. The gap resistance is the resistance between the cathode and workpiece. When the cathode and workpiece are in mechanical contact the gap resistance is essentially zero. At normal working gaps the electrical resistance of the gap is typically 26 ohms for small diameter cathodes.

Spark detection methods which protect against electrical contact between the cathode and workpiece during normal operation, or against malfunctions caused by the generation of a spark in the circuit, are well known in the art. One example of a spark detection apparatus may be found in U.S. Pat. No. 3,761,380. The spark detection method disclosed in the referenced patent is dependent upon the voltage between the cathode 12 and the workpiece fixture 16 decreasing to a preset level when a spark occurs resulting in the high speed interruption of the main ECM current by opening the switch 26. This protection is obviously not available when the ECM apparatus is turned on after a period of nonmachining operations if the cathode and workpiece are sufficiently close that the gap resistance is lower than normal. At turn-on the voltage between the cathode and the workpiece would be very small or essentially zero, and would not be sufficient to actuate the protective device. As an alternative, protection against a smaller than normal gap resistance between the cathode and workpiece may be afforded by a current responsive trip device positioned in the cathode circuit which is set to turn off the power when the current achieves a level slightly above the normal peak cathode current.

Neither of the above spark detection devices is entirely satisfactory because of their slow rate of response. For adequate spark detection the L/R (inductance to resistance) ratio of the main ECM current loop is made intentionally large in order to produce a large change in the cathode-to-workpiece voltage and a rapid voltage rate change in order to provide signals to the spark detector of adequate magnitude and with minimum lag time to turn off the main power supply. A large L/R ratio results in a relatively slow rate of rise of current to the current level trip device, resulting in relatively slow action and an increase in the heating condition which will produce possibly more severe damage over that which results from a so-called normal spark-out.

The circuit of FIG. 3 avoids the inadequacies of the prior art spark detection devices and will provide adequate protection against cathode-to-fixture resistance which is lower than normal at the time of apparatus turn-on. Referring to the figure, a high speed electronic threshold detector such as a voltage comparator 40 is connected across the cathode-to-workpiece fixture gap by means of leads 42 and 44. A source of reference voltage V is also fed to the voltage comparator 40 through a variable resistor 46. The trip voltage for the voltage comparator 40, typically 300 millivolts, is set by variable resistor 46 according to the resistance of an individual cathode, typically 1 ohm or less. When the ECM gap voltage is below the trip voltage level set in comparator 40, an output signal is generated on line 48 which is used to prevent the closing of power supply switch 26 as shown by dotted line 50. A relay or other well-known electrical device may be used to respond to the output signal and cause switch 26 to remain open. A lamp 52 may be turned on when a signal appears on line 48 to warn the machine operator that the cathode is in mechanical contact with the workpiece fixture or is sufficiently close that the work gap is less than normal, and that power should not be applied to the ECM apparatus. Any automatic device responsive to a gap voltage less than the trip or reference voltage is contemplated by the present invention.

The circuit of FIG. 3 provides protection even with small diameter multiple cathode tooling, with all cathode tips beneath the surface of the workpiece and with comparatively conductive electrolyte flowing down through the cathode bore and passing in a thin film across the small working gap in the order of 0.001 to 0.002 inch between the cathode tips and the correspondingly shaped bottom of the holes being machined.

The pilot light 52 is particularly useful in restarting the ECM apparatus after interruption by a spark-out or current level trip by providing an indication to the operator when a fault condition persists and allowing the cathode to be withdrawn just sufficiently to extinguish the pilot light prior to restarting. This procedure not only saves time, but also serves to minimize the hole diameter enlargement that would result from redrilling a portion of a machined hole or holes.

Although the invention has been described in its preferred embodiment, it is apparent that modifications to the construction and operation may be made without departing from the scope of the invention as hereinafter claimed.

We claim:

1. In an electrochemical machining apparatus in which a cathode is spaced from a fixture-supported workpiece to provide a gap therebetween into which an electrolyte is disposed, said apparatus containing a first source of DC voltage which is connected intermittently to produce a DC potential difference between said workpiece and said cathode, a high DC current flowing from said workpiece to said cathode when said first DC source is connected and producing an electrochemical reaction at said workpiece, the improvement comprising a second source of DC voltage, the magnitude of which is less than said first source, connected to generate a DC potential difference between said workpiece fixture and said cathode for producing a continuous DC current flow from said workpiece fixture to said cathode of a magnitude substantially less than the current flow produced by said first voltage source, means for producing an operating signal indicative of the voltage drop produced by said second DC voltage source across said workpiece fixture and said cathode during periods when said first DC voltage source is disconnected, means for producing a reference signal, a comparator for comparing said operating signal with said reference signal and producing therefrom an output signal when said reference signal exceeds said operating signal, and means responsive to said output signal for preventing connection of said first DC voltage source to produce a DC potential difference between said workpiece and said cathode.

2. The improvement as set forth in claim 1 and including diode means connected in series between said second voltage source and said workpiece for protecting said second voltage source from the current flow produced by said first voltage source.

3. The improvement as set forth in claim 2 and including second diode means connected in series with said second voltage source across said workpiece fixture and said cathode for regulating the potential difference produced by said second voltage source between said workpiece and said cathode.

4. The improvement as set forth in claim 1 and further including a pilot light connected to receive said output signal and operable only in response to the presence of said output signal.

* * * * *